UNITED STATES PATENT OFFICE.

LOUIS PIRWITZ AND WILHELM BEHR, OF HANOVER, GERMANY.

PROCESS OF PRODUCING A NON-CONDUCTING MATERIAL OR COMPOSITION.

SPECIFICATION forming part of Letters Patent No. 641,923, dated January 23, 1900.

Application filed February 1, 1899. Serial No. 704,164. (No specimens.)

*To all whom it may concern:*

Be it known that we, LOUIS PIRWITZ, manufacturer, residing at 2 Langestrasse, and WILHELM BEHR, merchant, residing at 36 Osterstrasse, Hanover, Kingdom of Prussia, Germany, subjects of the King of Prussia, German Emperor, have invented new and useful Improvements in Processes for the Production of an Improved Non-Conducting Material or Composition, of which the following is a specification.

The invention forming the subject of the present application is a process for the production of an improved non-conducting material or composition to be used with steam-boilers and the like.

The improved non-conducting material or composition produced according to the hereinafter-described process distinguishes itself in being utterly indestructible and when completely dry in standing ten millimeters apart from the walls it covers—such as vertical walls, steam-domes, and vertical boilers—thus forming an air-space of ten millimeters between the outer surface of the object and the non-conducting covering surrounding same for the reception of the heat emitting from the object without the material losing thereby in durability. The desired purpose of forming a non-conducting protective covering is completely attained by this invention.

The process consists in thoroughly mixing fifty per cent. of carbonate of lime with fifteen per cent. of chlorid of manganese and twenty per cent. of a three-per-cent. chlorid-of-calcium lye and by adding to this mixture ten per cent. of finely-ground down-feathers and five per cent. of large ordinary feathers, these proportions being measured by weight. The surfaces to be protected are coated with this papescent mass.

The thus-prepared material will be extremely durable when dried and acts as an excellent non-conducting covering.

Having now particularly described our invention, what we claim as new, and desire to secure by Letters Patent, is—

The process for the production of a non-conducting material or composition consisting in adding to fifty per cent. of carbonate of lime, fifteen per cent. of chlorid of manganese, twenty per cent. of a three-per-cent. chlorid-of-calcium lye, ten per cent. of finely-ground down-feathers and five per cent. of large ordinary feathers; the whole is then mixed into a papescent mass and thereupon applied to the surfaces to be coated, substantially as set forth.

In testimony whereof we have hereunto set our hands in presence of two subscribing witnesses.

LOUIS PIRWITZ.
WILHELM BEHR.

Witnesses:
KIRKE LATHROP,
LEONORE BASCH.